United States Patent
Iwai et al.

(10) Patent No.: US 10,526,968 B2
(45) Date of Patent: Jan. 7, 2020

(54) GAS TURBINE FACILITY

(71) Applicant: TOSHIBA ENERGY SYSTEMS & SOLUTIONS CORPORATION, Kawasaki-shi (JP)

(72) Inventors: Yasunori Iwai, Yokohama (JP); Masao Itoh, Yokohama (JP); Yuichi Morisawa, Yokohama (JP); Shinju Suzuki, Yokohama (JP)

(73) Assignee: TOSHIBA ENERGY SYSTEMS & SOLUTIONS CORPORATION, Kawasaki-shi (JP)

( * ) Notice: Subject to any disclaimer, the term of this patent is extended or adjusted under 35 U.S.C. 154(b) by 850 days.

(21) Appl. No.: 14/978,595

(22) Filed: Dec. 22, 2015

(65) Prior Publication Data
US 2017/0175624 A1 Jun. 22, 2017

(51) Int. Cl.
*F23R 3/06* (2006.01)
*F02C 3/34* (2006.01)

(52) U.S. Cl.
CPC . *F02C 3/34* (2013.01); *F23R 3/06* (2013.01)

(58) Field of Classification Search
CPC ...... F02C 1/00; F02C 1/08; F02C 3/00; F02C 3/30; F02C 3/34; F02C 7/08; F02C 7/10; F02C 7/12; F02C 7/18; F02C 7/185; F23R 3/00; F23R 3/02; F23R 3/08;
(Continued)

(56) References Cited

U.S. PATENT DOCUMENTS

| 4,204,402 A | * | 5/1980 | Craig | ........................ F23R 3/34 60/733 |
| 4,466,250 A | * | 8/1984 | Mukaeda | .................. F02C 3/14 431/242 |
| 4,498,289 A | | 2/1985 | Osgerby et al. | |

(Continued)

FOREIGN PATENT DOCUMENTS

| CA | 1 198 599 A | 12/1985 |
| CA | 2 856 993 | 1/2015 |

(Continued)

OTHER PUBLICATIONS

Combined Search and Examination Report dated May 31, 2016 in United Kingdom Patent Application No. GB1522299.5.
(Continued)

*Primary Examiner* — Jason H Duger
(74) *Attorney, Agent, or Firm* — Oblon, McClelland, Maier & Neustadt, L.L.P.

(57) ABSTRACT

A gas turbine facility 10 of an embodiment includes: a combustor 20; a cylinder 80 dividing a space between a combustor casing 70 and the combustor 20; and a turbine 25 rotated by a combustion gas exhausted from the combustor 20. The gas turbine facility 10 includes: a heat exchanger 24 which cools the combustion gas; a pipe 42 through which a part of the combustion gas cooled in the heat exchanger 24 passes in the heat exchanger 24 to be heated and is guided to a space between the combustor 20 and the cylinder 80; a pipe 44 which guides another part of the combustion gas cooled in the heat exchanger 24 to a space between the combustor casing 70 and the cylinder 80; and a pipe 45 which exhausts a remaining part of the combustion gas cooled in the heat exchanger 24 to the outside.

3 Claims, 7 Drawing Sheets

(58) Field of Classification Search
CPC .. F23R 2900/03341; F23R 2900/03043; F23R 2900/03045; F01K 17/025; F01K 23/10
See application file for complete search history.

(56) References Cited

U.S. PATENT DOCUMENTS

| | | | |
|---|---|---|---|
| 6,269,624 | B1* | 8/2001 | Frutschi .............. F01K 21/047 60/783 |
| 2009/0133403 | A1 | 5/2009 | Som et al. |
| 2009/0284013 | A1 | 11/2009 | Anand et al. |
| 2011/0179799 | A1 | 7/2011 | Allam et al. |
| 2012/0260660 | A1 | 10/2012 | Kraemer et al. |
| 2013/0125554 | A1 | 5/2013 | Mittricker et al. |
| 2013/0180261 | A1 | 7/2013 | Stoia et al. |
| 2014/0020402 | A1 | 1/2014 | Okamura et al. |
| 2014/0023478 | A1* | 1/2014 | Maeda .............. F01D 3/04 415/1 |
| 2015/0020497 | A1 | 1/2015 | Iwai et al. |
| 2015/0027099 | A1 | 1/2015 | Iwai et al. |
| 2015/0121898 | A1* | 5/2015 | Tashima .............. F01D 9/06 60/806 |

FOREIGN PATENT DOCUMENTS

| | | |
|---|---|---|
| CN | 101446421 A | 6/2009 |
| CN | 102733955 A | 10/2012 |
| CN | 104329170 | 2/2015 |
| CN | 104343537 A | 2/2015 |
| GB | 2532334 A | 5/2016 |
| JP | 55-81233 A | 6/1980 |
| JP | 57-183530 A | 11/1982 |
| JP | 2000-337107 | 12/2000 |
| JP | 2014-20331 A | 2/2014 |
| JP | 2014-37825 A | 2/2014 |
| WO | WO 2004/072443 A1 | 8/2004 |

OTHER PUBLICATIONS

Canadian Office Action dated Nov. 17, 2016 in Patent Application No. 2,916,166.

Examination Report dated Sep. 2, 2016 in Australian Patent Application No. 2015275260.

U.S. Appl. No. 14/331,361, filed Jul. 15, 2014, 2015/0020497 A1, Yasunori Iwai, et al.

Combined Chinese Office Action and Search Report dated Jan. 29, 2018 in Patent Application No. 201510983095.8 (with partial English translation and English translation of categories of cited documents), 13 pages.

Japanese Decision to Grant dated Dec. 5, 2017 in Japanese Patent Application No. 2014-131357 (with unedited computer generated English translation), 6 pages.

* cited by examiner

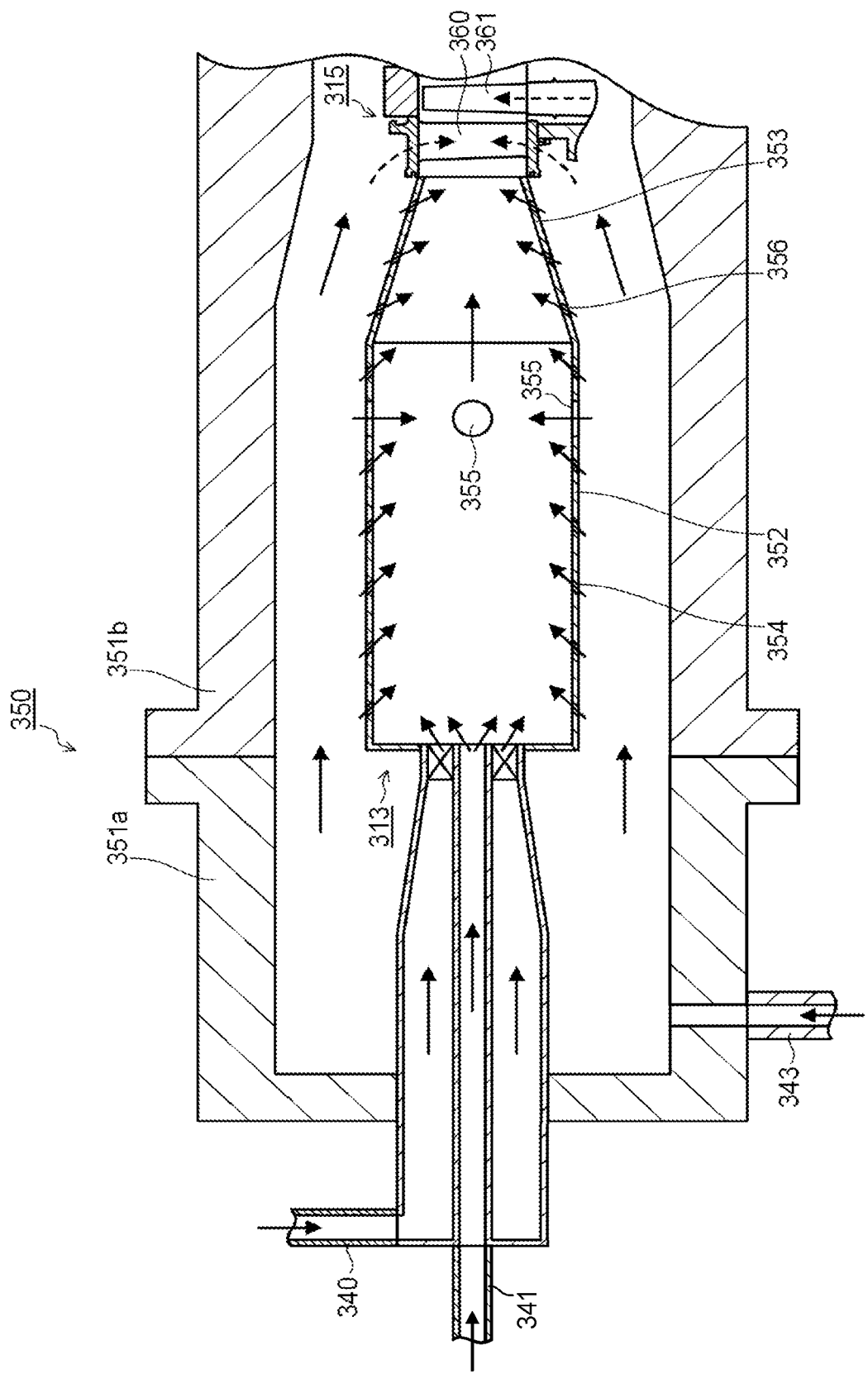

GAS TURBINE FACILITY

FIELD

Embodiments described herein relate generally to a gas turbine facility.

BACKGROUND

Increasing the efficiency of power generation plants is in progress in response to demands for reduction of carbon dioxide, resource saving, and the like. Specifically, increasing the temperature of a working fluid of a gas turbine and a steam turbine, employing a combined cycle and the like are actively in progress. Further, research and development of collection techniques of carbon dioxide are in progress.

FIG. 6 is a system diagram of a conventional gas turbine facility 300 in which a part of carbon dioxide produced in a combustor is circulated as a working fluid. FIG. 7 is a view schematically illustrating a vertical section of a combustor 313 provided in the conventional gas turbine facility 300.

As illustrated in FIG. 6, in the conventional gas turbine facility 300, oxygen separated by an air separating apparatus (not illustrated) is introduced to a pipe 340. Then, the oxygen is pressurized by a compressor 310 and its flow rate is controlled by a flow rate regulating valve 311. The oxygen having passed through the flow rate regulating valve 311 is heated by receiving a heat quantity from a later-described combustion gas in a heat exchanger 312 and supplied to the combustor 313.

A fuel is guided to a pipe 341 from a fuel supply source (not illustrated). Then, the fuel has its flow rate regulated by a flow rate regulating valve 314 and is supplied to the combustor 313. This fuel is hydrocarbon.

In the combustor 313, as illustrated in FIG. 7, the oxygen supplied from the pipe 340 and the fuel supplied from the pipe 341 are introduced to a combustion region. Then, the oxygen and the fuel undergo a combustion reaction to produce the combustion gas. The combustion gas contains carbon dioxide and water vapor. The flow rates of the fuel and the oxygen are regulated so as to have a stoichiometric mixture ratio (theoretical mixture ratio) in a state where they are completely mixed together.

The combustion gas produced in the combustor 313 is introduced to a turbine 315. Note that, as illustrated in FIG. 6, for example, a power generator 319 is coupled to the turbine 315. The combustion gas having performed expansion work in the turbine 315 passes through the heat exchanger 312. At this time, the heat quantity is released to heat the above-described oxygen flowing through the pipe 340 and later-described carbon dioxide flowing through a pipe 343. The combustion gas having passed through the heat exchanger 312 passes through a heat exchanger 316 further. When the combustion gas passes through the heat exchanger 316, the water vapor in the combustion gas condenses into water. The water is discharged through a pipe 342 to the outside.

The carbon dioxide separated from the water vapor is pressurized by a compressor 317 interposed in the pipe 343 to become a supercritical fluid. A part of the pressurized carbon dioxide is introduced to a pipe 344 branching off from the pipe 343. The carbon dioxide introduced to the pipe 344 has its flow rate regulated by a flow rate regulating valve 318 and is extracted to the outside.

Meanwhile, the remaining part of the carbon dioxide flows through the pipe 343. Then, the carbon dioxide is heated in the heat exchanger 312 and, as illustrated in FIG. 7, is supplied into a combustor casing 350 housing the combustor 313. A temperature of the carbon dioxide having passed through the heat exchanger 312 becomes about 700° C. Here, the combustor casing 350 is constituted by an upstream-side casing 351a and a downstream-side casing 351b.

The carbon dioxide guided into the upstream-side casing 351a flows toward the turbine 315 between the downstream-side casing 351b and, a combustor liner 352 and a transition piece 353 (tail pipe). Thus, the carbon dioxide other than the one exhausted from the pipe 344 circulates in the system.

When the carbon dioxide flows between the downstream-side casing 351b and, the combustor liner 352 and the transition piece 353, the carbon dioxide cools the combustor liner 352 and the transition piece 353. The above cooling is performed by porous film cooling and the like, for example. A part of the carbon dioxide is introduced into the combustor liner 352 and the transition piece 353 from holes 354, 356 of a porous film cooling part, dilution holes 355, and the like, as illustrated in FIG. 7. Further, this carbon dioxide is used also for cooling stationary blades 360 and rotor blades 361 of the turbine 315.

The carbon dioxide introduced into the combustor liner 352 and the transition piece 353 is introduced to the turbine 315 together with the combustion gas produced by combustion.

Here, the upstream-side casing 351a and the downstream-side casing 351b are exposed to the high-temperature carbon dioxide, and therefore, they are composed of an expensive Ni-based alloy.

As described above, in the conventional gas turbine facility 300, the upstream-side casing 351a and the downstream-side casing 351b which are exposed to the high-temperature carbon dioxide are to be composed of the expensive Ni-based alloy. Therefore, a manufacturing cost for the gas turbine facility increases.

BRIEF DESCRIPTION OF THE DRAWINGS

FIG. 7 is a view schematically illustrating a vertical section of the combustor which is provided in the conventional gas turbine facility.

DETAILED DESCRIPTION

In one embodiment, a gas turbine facility includes: a combustor provided in a casing to combust a fuel and an oxidant; a cylinder dividing a space between the casing and the combustor; and a turbine rotated by a combustion gas exhausted from the combustor.

Further, the gas turbine facility includes: a heat exchanger which cools the combustion gas exhausted from the turbine; a high-temperature combustion gas supply pipe through which a part of the combustion gas cooled in the heat exchanger passes in the heat exchanger to be heated, and is guided to a space between the combustor and the cylinder; a low-temperature combustion gas supply pipe which guides another part of the combustion gas cooled in the heat exchanger to a space between the casing and the cylinder; and an exhaust pipe which exhausts a remaining part of the combustion gas cooled in the heat exchanger to an outside.

Hereinafter, embodiments of the present invention will be described with reference to the drawings.

First Embodiment

Figure 1:
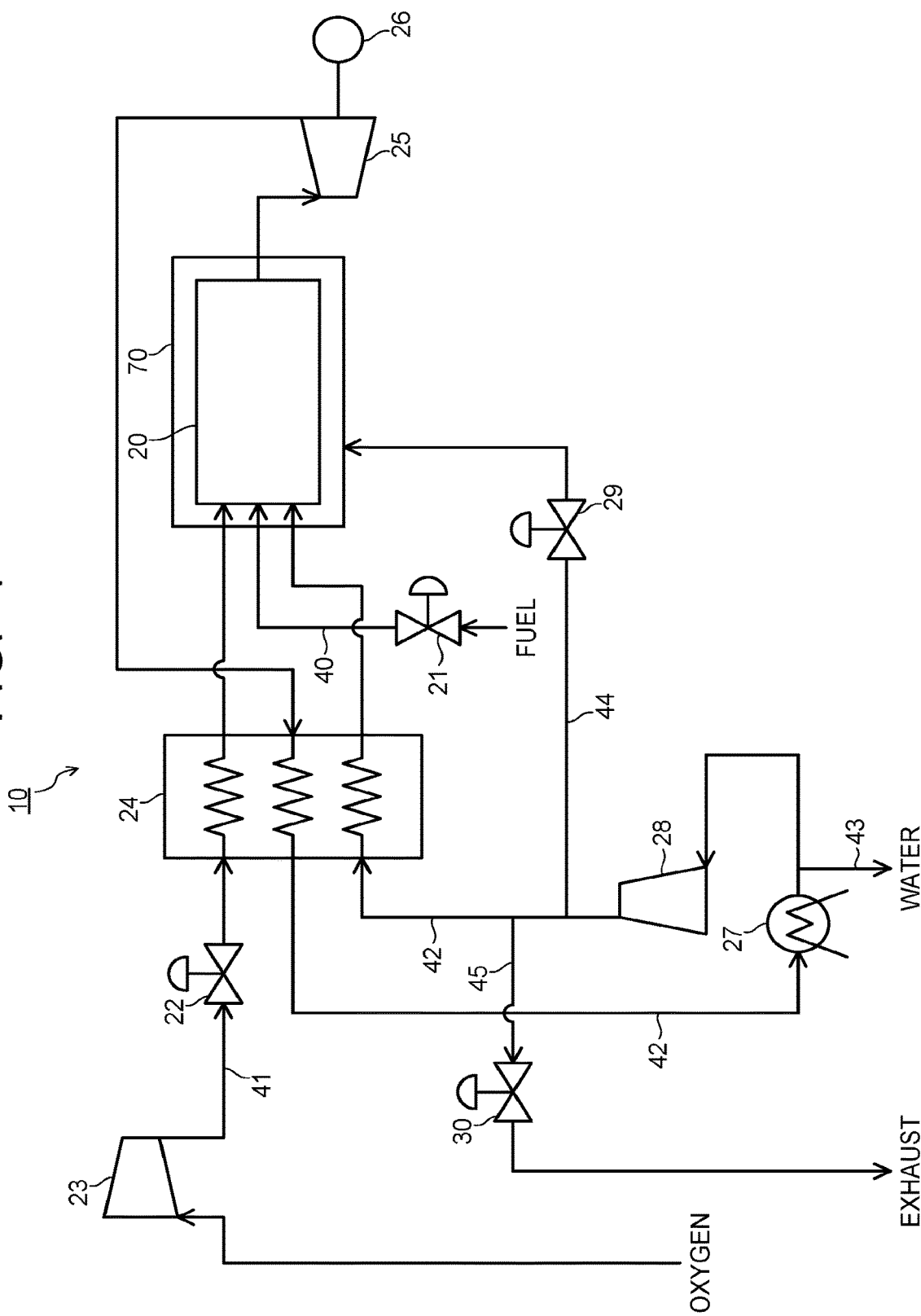
FIG. 1 is a system diagram of a gas turbine facility of a first embodiment.

FIG. 1 is a system diagram of a gas turbine facility 10 of a first embodiment. As illustrated in FIG. 1, the gas turbine facility 10 includes: a combustor 20 which combusts a fuel and an oxidant; a pipe 40 which supplies the fuel to this combustor 20; and a pipe 41 which supplies the oxidant to the combustor 20.

The pipe 40 includes a flow rate regulating valve 21 which regulates a flow rate of the fuel to be supplied to the combustor 20. Here, as the fuel, for example, hydrocarbon such as methane and natural gas is used. Further, as the fuel, for example, a coal gasification gas fuel containing carbon monoxide, hydrogen, and the like can be also used.

The pipe 41 includes a flow rate regulating valve 22 which regulates a flow rate of the oxidant to be supplied to the combustor 20. Further, a compressor 23 which pressurizes the oxidant is provided in the pipe 41. As the oxidant, oxygen separated from the atmosphere by an air separating apparatus (not illustrated) is used. The oxidant flowing through the pipe 41 is heated by passing through a later-described heat exchanger 24 and is supplied to the combustor 20.

The fuel and the oxidant guided to the combustor 20 undergo a combustion reaction in a combustion region and are turned into a combustion gas. Here, in the gas turbine facility 10, it is preferable that surplus parts of the oxidant (oxygen) and the fuel do not remain in the combustion gas that is to be exhausted from the combustor 20. Accordingly, the flow rates of the fuel and the oxidant are regulated so as to have a stoichiometric mixture ratio (equivalence ratio 1), for example. Note that the equivalence ratio mentioned here is an equivalence ratio when it is assumed that the fuel and the oxygen are uniformly mixed (overall equivalence ratio).

The gas turbine facility 10 includes a turbine 25 which is rotated by the combustion gas exhausted from the combustor 20. For example, a power generator 26 is coupled to this turbine 25. The combustion gas exhausted from the combustor 20, which is mentioned here, is the one containing a combustion product produced from the fuel and the oxidant and later-described carbon dioxide (a combustion gas from which water vapor has been removed) which is supplied to the combustor 20 and exhausted from the combustor 20 together with the combustion product.

The combustion gas exhausted from the turbine 25 is guided to a pipe 42 and cooled by passing through the heat exchanger 24. At this time, the above-described oxidant flowing through the pipe 41 and the later-described carbon dioxide flowing through the pipe 42 are heated by heat release from the combustion gas.

The combustion gas having passed through the heat exchanger 24 passes through a heat exchanger 27 further. The combustion gas is got rid of the water vapor contained in the combustion gas by passing through this heat exchanger 27. Note that the water vapor in the combustion gas condenses into water by passing through the heat exchanger 27. The water is discharged through a pipe 43 to the outside, for example.

Here, as described above, when the flow rates of the fuel and the oxidant are regulated so as to have the stoichiometric mixture ratio (equivalence ratio 1), most of components of the combustion gas from which the water vapor has been removed (dry combustion gas) are the carbon dioxide. Note that a slight amount of, for example, 0.2% or less, carbon monoxide is sometimes mixed in the combustion gas from which the water vapor has been removed, but hereinafter, the combustion gas from which the water vapor has been removed is simply referred to as carbon dioxide.

The carbon dioxide is pressurized by a compressor 28 interposed in the pipe 42 to become a supercritical fluid. A part of the carbon dioxide pressurized by the compressor 28 flows through the pipe 42 and is heated in the heat exchanger 24. Then, the carbon dioxide is guided into a later-described combustor casing 70 housing the combustor 20. A temperature of the carbon dioxide having passed through the heat exchanger 24 becomes about 700° C. Note that the pipe 42 which guides this high-temperature carbon dioxide to the combustor casing 70 functions as a high-temperature combustion gas supply pipe.

Another part of the carbon dioxide pressurized by the compressor 28 is introduced to a pipe 44 branching off from the pipe 42. The carbon dioxide introduced to the pipe 44 has its flow rate regulated by a flow rate regulating valve 29 and, as a cooling medium, is guided into the combustor casing 70. A temperature of the carbon dioxide guided into the combustor casing 70 by the pipe 44 is about 400° C. Note that the pipe 44 functions as a low-temperature combustion gas supply pipe.

Meanwhile, the remaining part of the carbon dioxide pressurized by the compressor 28 is introduced to a pipe 45 branching off from the pipe 42. The carbon dioxide introduced to the pipe 45 has its flow rate regulated by a flow rate regulating valve 30 and is exhausted to the outside. Note that the pipe 45 functions as an exhaust pipe. The carbon dioxide exhausted to the outside can be utilized for EOR (Enhanced Oil Recovery) employed at an oil drilling field, for example.

Next, a constitution of the combustor casing 70 and a flow of the carbon dioxide in the combustor casing 70 of the gas turbine facility 10 of the first embodiment will be described.

Figure 2:
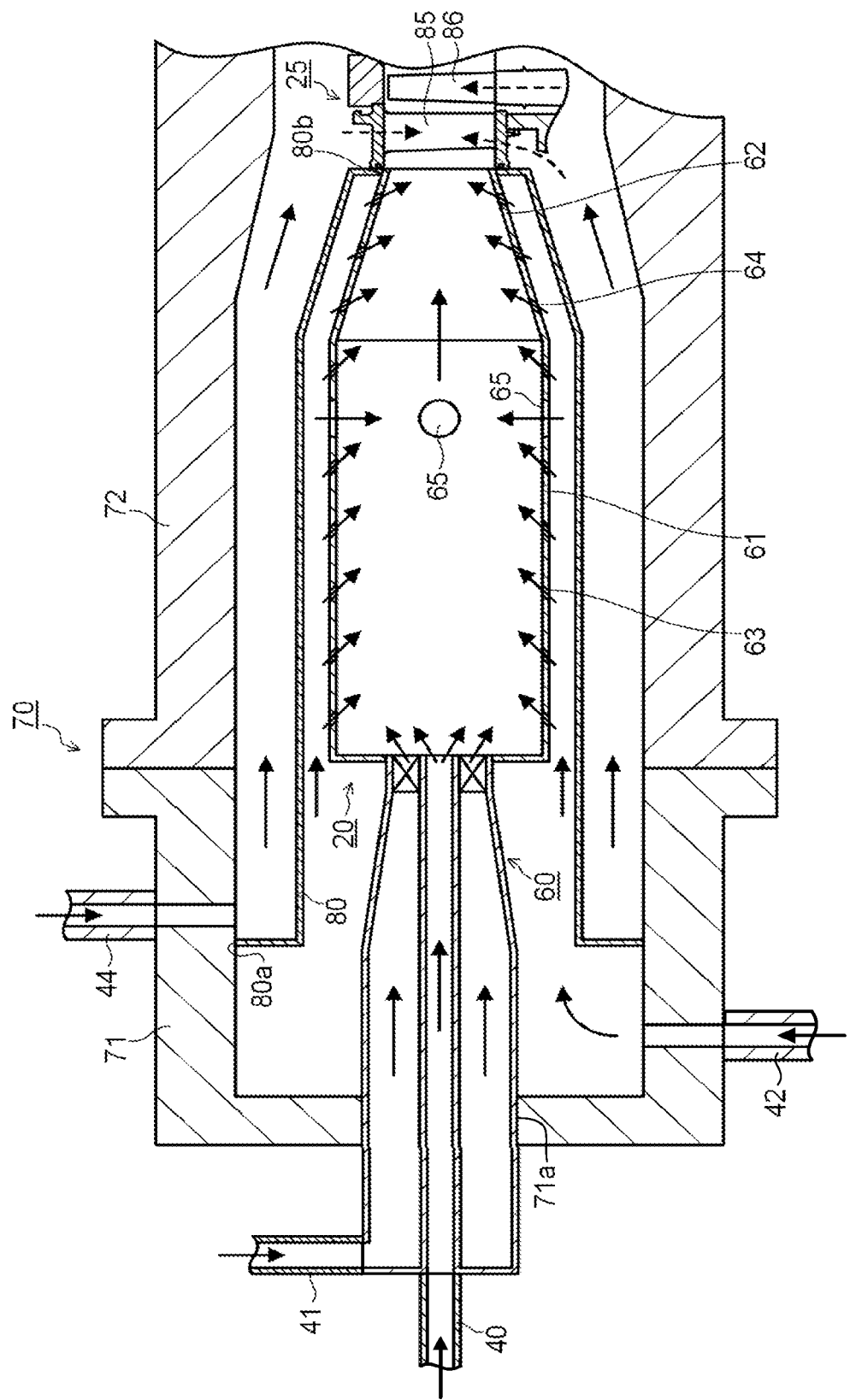
FIG. 2 is a view schematically illustrating a vertical section of a combustor and a combustor casing which are provided in the gas turbine facility of the first embodiment.

FIG. 2 is a view schematically illustrating a vertical section of the combustor 20 and the combustor casing 70 which are provided in the gas turbine facility 10 of the first embodiment.

As illustrated in FIG. 2, the combustor 20 includes: a fuel nozzle part 60; a combustor liner 61; and a transition piece 62 (tail pipe). The fuel nozzle part 60 jets the fuel supplied from the pipe 40 and the oxidant supplied from the pipe 41 into the combustor liner 61. For example, the fuel is jetted from the center of the fuel nozzle part 60 and the oxidant is jetted from the periphery of the center. The combustor 20 is housed inside the combustor casing 70.

The combustor casing 70 is provided along a longitudinal direction of the combustor 20 so as to surround the combustor 20. The combustor casing 70 is divided into two parts in the longitudinal direction of the combustor 20, for example. The combustor casing 70 is constituted by an upstream-side casing 71 on an upstream side and a downstream-side casing 72 on a downstream side, for example. Note that the combustor casing 70 functions as a casing.

The upstream-side casing 71 is constructed of a cylindrical body such as a cylinder in which one end (upstream side) is closed and the other end (downstream side) is opened, for example. In the center of the one end, an opening 71a in which the fuel nozzle part 60 is inserted is formed. As illustrated in FIG. 2, the pipe 42 and the pipe 44 are coupled to the upstream-side casing 71. The pipe 42 is coupled to the upstream-side casing 71 at a more upstream side than the pipe 44, for example. Note that coupling portions of the pipe 42 and the pipe 44 to the upstream-side casing 71 are not limited to each one place and may be placed at plural places in a circumferential direction.

The downstream-side casing 72 is constructed of a cylindrical body in which both ends are opened. One end of the downstream-side casing 72 is connected to the upstream-side casing 71 and the other end thereof is connected to, for example, a casing (not illustrated) surrounding the turbine 25.

As illustrated in FIG. 2, between the combustor casing 70 and the combustor 20, a cylinder 80 dividing a space therebetween is provided. The cylinder 80 is provided along the longitudinal direction of the combustor 20 between the combustor casing 70 and the combustor 20. That is, the cylinder 80 divides the space between the combustor casing 70 and the combustor 20 into an inside diameter side and an outside diameter side.

An upstream-side end portion 80a of the cylinder 80 is connected to an inner peripheral surface of the upstream-side casing 71 at a more upstream side than a position where the pipe 44 is coupled as well as at a more downstream side than a position where the pipe 42 is coupled. On the other hand, a downstream-side end portion 80b of the cylinder 80 is connected to an outer peripheral surface of a downstream end portion of the transition piece 62.

That is, the cylinder 80 is provided so that the low-temperature carbon dioxide introduced from the pipe 44 flows between the combustor casing 70 and the cylinder 80. Further, the cylinder 80 is provided so that the high-temperature carbon dioxide introduced from the pipe 42 flows between the combustor 20 and the cylinder 80. Thus, the carbon dioxide introduced from the pipe 42 and the carbon dioxide introduced from the pipe 44 can flow separately from each other.

The carbon dioxide introduced from the pipe 42 flows while cooling the combustor liner 61 and the transition piece 62. Then, this carbon dioxide is introduced into the combustor liner 61 and the transition piece 62 from, for example, holes 63, 64 of a porous film cooling part, dilution holes 65, and the like of the combustor liner 61 and the transition piece 62. Thus, the whole amount of the carbon dioxide introduced from the pipe 42 is introduced into the combustor liner 61 and the transition piece 62. Note that the carbon dioxide introduced into the combustor liner 61 and the transition piece 62 is introduced to the turbine 25 together with the combustion gas produced by combustion.

Here, the temperature of the carbon dioxide introduced from the pipe 42 is about 700° C. This temperature of the carbon dioxide is lower compared to a temperature of the combustion gas to which the combustor liner 61 and the transition piece 62 are exposed. Therefore, the combustor liner 61 and the transition piece 62 can be sufficiently cooled. Further, since the temperature of the carbon dioxide is about 700° C., the combustion reaction is not impaired even when the carbon dioxide is introduced into the combustor liner 61.

Meanwhile, the carbon dioxide introduced from the pipe 44 flows while cooling a part of the upstream-side casing 71, the downstream-side casing 72, and the cylinder 80. Then, this carbon dioxide is used also for cooling stationary blades 85 and rotor blades 86 of the turbine 25, for example. In this case, a temperature of the downstream-side casing 72 becomes 400° C. or lower, for example.

In the combustor casing 70 with the above constitution, the upstream-side casing 71 has a portion exposed to the high-temperature carbon dioxide. Therefore, the upstream-side casing 71 is composed of a Ni (nickel)-based alloy, for example. On the other hand, the downstream-side casing 72 is cooled by the low-temperature carbon dioxide without being exposed to the high-temperature carbon dioxide. Therefore, the downstream-side casing 72 is composed of Fe (iron)-based heat resistant steel such as CrMoV steel and CrMo steel, for example.

Further, setting the coupling portions of the pipe 42 and the pipe 44 at more upstream portions of the upstream-side casing 71 decreases a portion exposed to the high-temperature carbon dioxide and increases a portion exposed to the low-temperature carbon dioxide, in the upstream-side casing 71. In this case, the upstream-side casing 71 can be composed of Fe-based heat resistant steel similarly to the downstream-side casing 72.

As described above, according to the gas turbine facility 10 of the first embodiment, the high-temperature carbon dioxide and the low-temperature carbon dioxide can be introduced into the combustor casing 70 surrounding the combustor 20. Further, including the cylinder 80 makes it possible that the low-temperature carbon dioxide flows between the combustor casing 70 and the cylinder 80 and the high-temperature carbon dioxide flows between the combustor 20 and the cylinder 80. Therefore, at least a part of the combustor casing 70 can be composed of inexpensive Fe-based heat resistant steel, for example. Accordingly, it is possible to reduce a manufacturing cost for the gas turbine facility 10.

Figure 3:
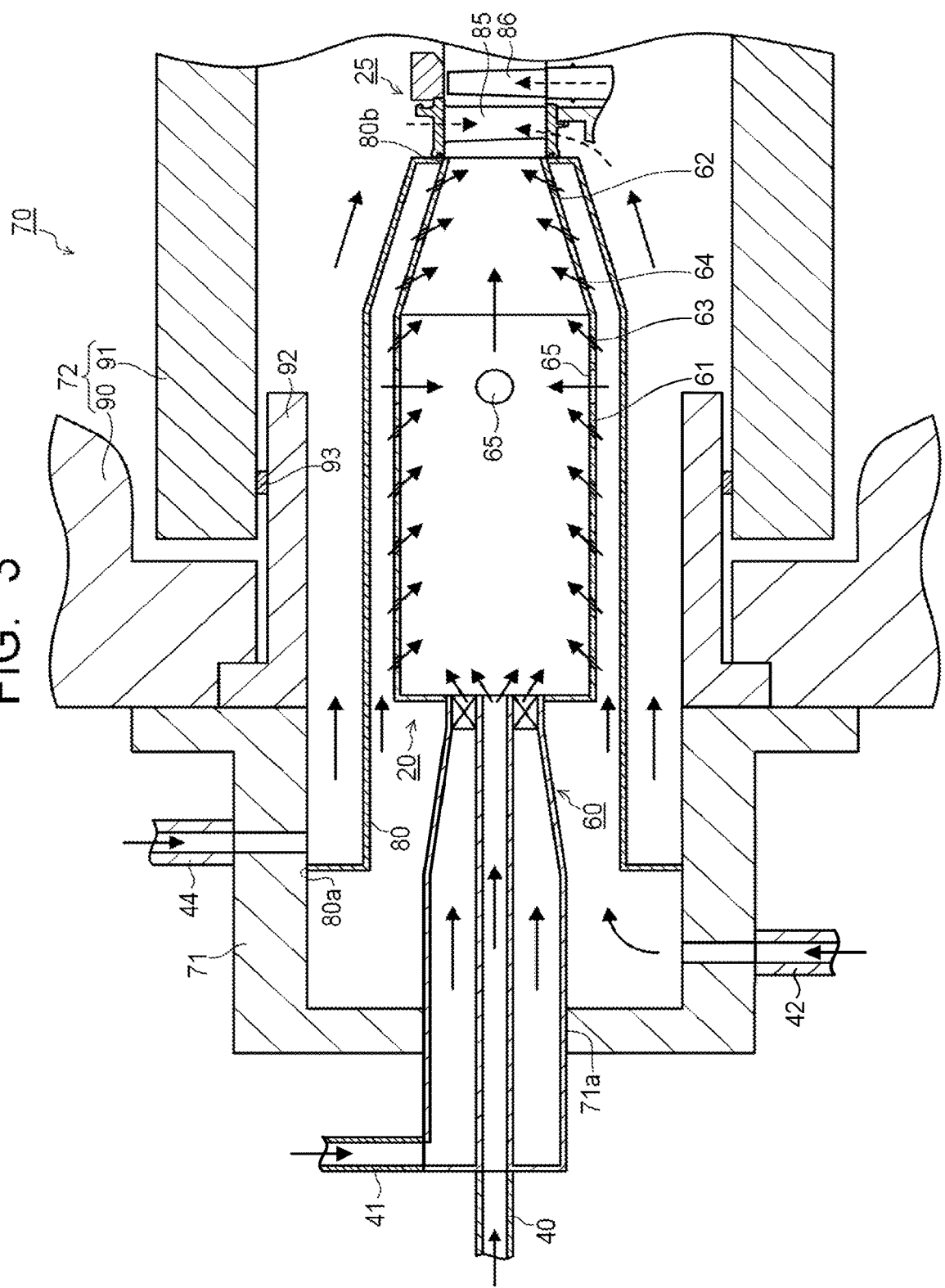
FIG. 3 is a view schematically illustrating a vertical section of the combustor and a combustor casing of another constitution which are provided in the gas turbine facility of the first embodiment.

Here, the constitution of the combustor casing 70 in the gas turbine facility 10 of the first embodiment is not limited to the one described above. FIG. 3 is a view schematically illustrating a vertical section of the combustor 20 and a combustor casing 70 with another constitution which are provided in the gas turbine facility 10 of the first embodiment.

For example, when a working pressure in a gas turbine becomes high as in a case where the carbon dioxide being the supercritical fluid is used as a part of a working fluid, it is preferable that, for example, a double casing structure of an outer casing and an inner casing is employed. In FIG. 3, one example in a case where such a double casing structure is employed is illustrated.

As illustrated in FIG. 3, a combustor casing 70 includes an upstream-side casing 71 on an upstream side and a downstream-side casing 72 on a downstream side. The downstream-side casing 72 includes an outer casing 90 and an inner casing 91 inside the outer casing 90. Further, along an inner periphery of an upstream-side end portion of the outer casing 90 and an inner periphery of an upstream-side end portion of the inner casing 91, a cylindrical sleeve 92 is provided in the longitudinal direction of the combustor 20. Moreover, between the sleeve 92 and the inner casing 91, an annular seal ring 93 is fitted, for example. Including the seal ring 93 prevents the carbon dioxide from leaking from between the outer casing 90 and the inner casing 91. Note that, here, the outer casing 90 and the sleeve 92 are connected to a downstream-side end face of the upstream-side casing 71.

In a case where the above constitution is included, the low-temperature carbon dioxide introduced from the pipe 44 flows while cooling a part of the upstream-side casing 71, the outer casing 90, the inner casing 91, the sleeve 92, and the cylinder 80. Therefore, the outer casing 90, the inner casing 91, the sleeve 92, and the cylinder 80 can be composed of inexpensive Fe-based heat resistant steel, for example.

Second Embodiment

Figure 4:
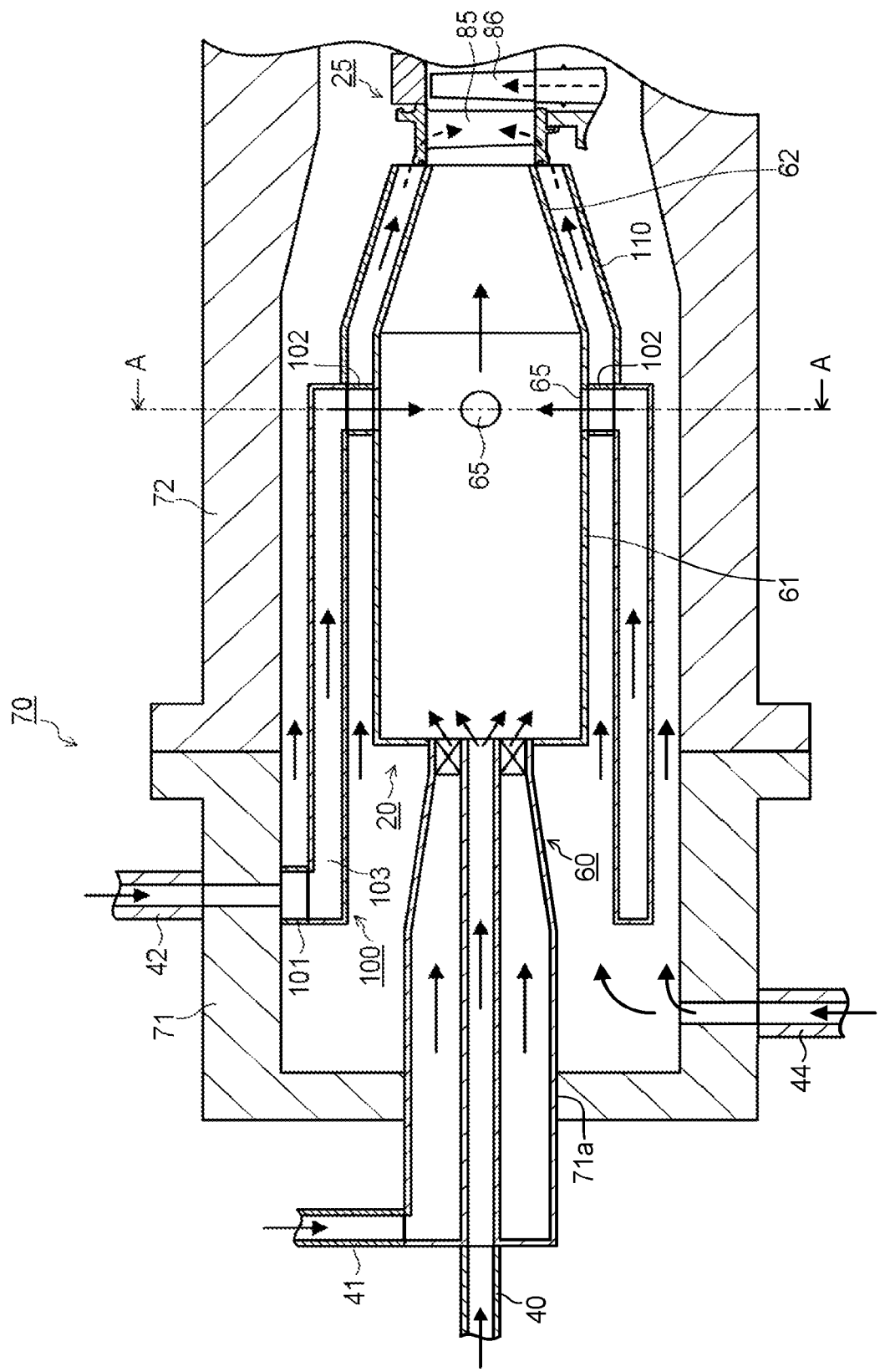
FIG. 4 is a view schematically illustrating a vertical section of a combustor and a combustor casing which are provided in a gas turbine facility of a second embodiment.
Figure 5:
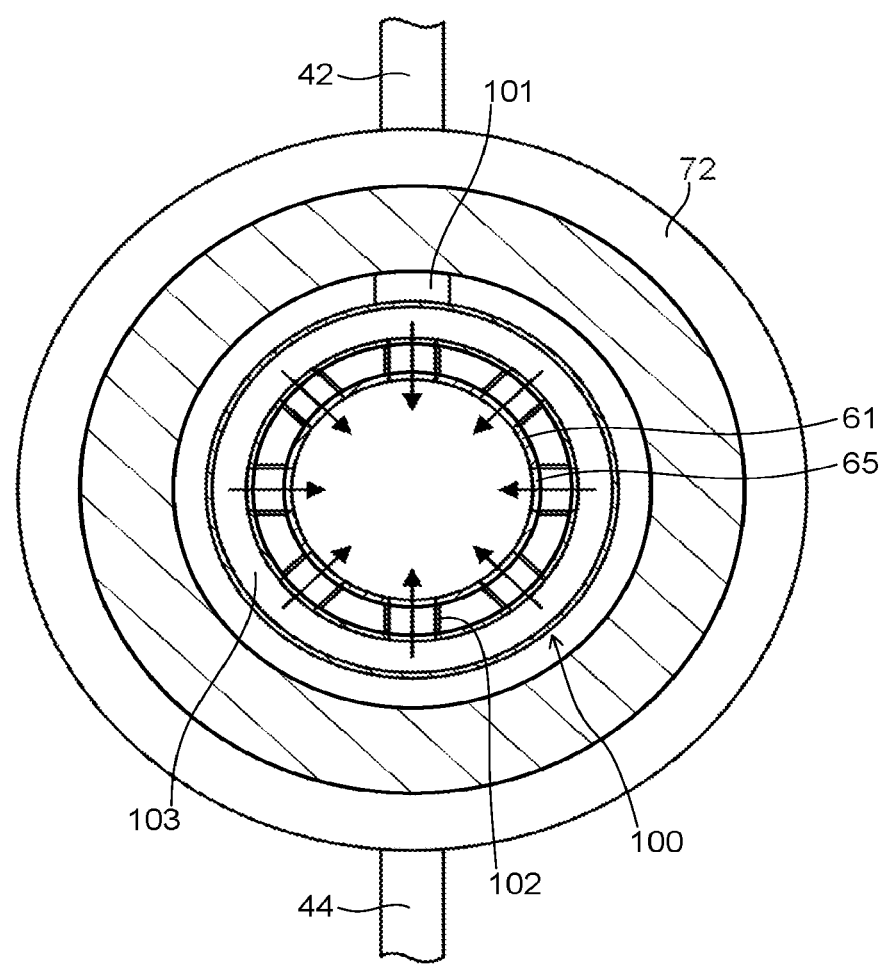
FIG. 5 is a view illustrating an A-A cross section in FIG. 4.
Figure 6:
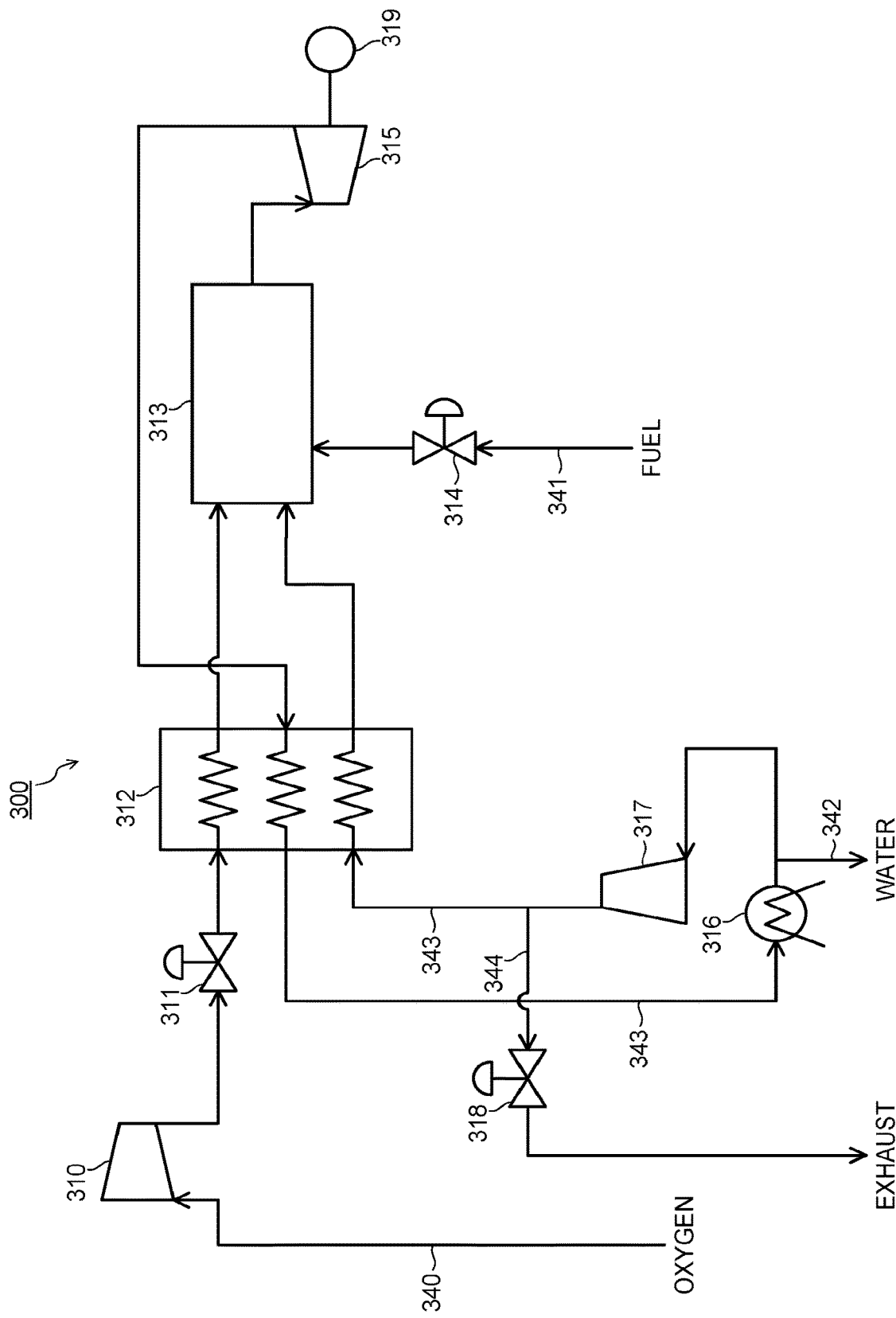
FIG. 6 is a system diagram of a conventional gas turbine facility in which a part of carbon dioxide produced in a combustor is circulated as a working fluid.

FIG. 4 is a view schematically illustrating a vertical section of a combustor 20 and a combustor casing 70 which are provided in a gas turbine facility 10 of a second embodiment. FIG. 5 is a view schematically illustrating an A-A cross section in FIG. 4. Note that the same constituent portions as those of the gas turbine facility 10 of the first embodiment are denoted by the same reference signs, and redundant descriptions are omitted or simplified. Further, a system diagram of the gas turbine facility 10 of the second embodiment is the same as the system diagram of the gas turbine facility 10 of the first embodiment.

As illustrated in FIG. 4, the combustor casing 70 is provided along a longitudinal direction of the combustor 20 (along a left and right direction in FIG. 4) so as to surround the combustor 20. The combustor casing 70 is divided into two parts in the longitudinal direction of the combustor 20, for example. The combustor casing 70 is constituted by an upstream-side casing 71 on an upstream side and a downstream-side casing 72 on a downstream side, for example. Note that the combustor casing 70 functions as a casing.

As illustrated in FIG. 4, a pipe 42 which introduces high-temperature carbon dioxide and a pipe 44 which introduces low-temperature carbon dioxide are coupled to the upstream-side casing 71. The pipe 44 is coupled to the upstream-side casing 71 at a more upstream side than the pipe 42, for example.

As illustrated in FIG. 4 and FIG. 5, between the combustor casing 70 and the combustor 20, a double-pipe structured cylinder 100 having an inner space 103 is provided. The cylinder 100 is provided along the longitudinal direction of the combustor 20 between the combustor casing 70 and the combustor 20. The cylinder 100 is a passage through which the high-temperature carbon dioxide guided by the pipe 42 is guided into a combustor liner 61 via dilution holes 65, for example.

Specifically, in one end (upstream side) of the cylinder 100, only a portion communicating with the pipe 42 is opened and the other portion is closed. For example, on the one end side of the cylinder 100, a communication pipe 101 which makes an opening of the cylinder 100 and the pipe 42 communicate with each other is provided. Note that the communication pipe 101 is not limited to being provided at one place and may be plurally provided in a circumferential direction so as to correspond to the pipe 42.

Meanwhile, in the other end (downstream side) of the cylinder 100, only portions communicating with the dilution holes 65 are opened and the other portion is closed. For example, on the other end sides of the cylinder 100, communication pipes 102 which make openings of the cylinder 100 and the dilution holes 65 communicate with each other are provided. For example, as illustrated in FIG. 5, the communication pipes 102 are plurally provided in the circumferential direction so as to correspond to the dilution holes 65.

The carbon dioxide introduced from the pipe 42 is guided through the communication pipe 101 to the inner space 103 in the cylinder 100. Then, the carbon dioxide flows through the inner space 103 in the cylinder 100, passes through the communication pipes 102, and is guided into the combustor liner 61 from the dilution holes 65. Thus, the whole amount of the carbon dioxide introduced from the pipe 42 is guided into the combustor liner 61 from the dilution holes 65. Therefore, the upstream-side casing 71 and the downstream-side casing 72 are not exposed to the high-temperature carbon dioxide.

Note that, since a temperature of the carbon dioxide introduced from the pipe 42 is about 700° C., a combustion reaction is not impaired even when the carbon dioxide is introduced into the combustor liner 61. Further, the carbon dioxide introduced into the combustor liner 61 is introduced to a turbine 25 together with a combustion gas produced by combustion.

Meanwhile, the carbon dioxide introduced from the pipe 44 flows while cooling the upstream-side casing 71, the downstream-side casing 72, the cylinder 100, the combustor liner 61, and a transition piece 62. A temperature of the upstream-side casing 71 and the downstream-side casing 72 becomes 400° C. or lower, for example. Then, the carbon dioxide which has cooled the combustor liner 61 and the transition piece 62 is used also for cooling stationary blades 85 and rotor blades 86 of the turbine 25, for example.

When the low-temperature carbon dioxide introduced from the pipe 44 flows around the combustor 20 as in the above, a structure such as, for example, a porous film cooling part which guides the carbon dioxide to the inside, is not provided in the combustor liner 61 and the transition piece 62. That is, the combustor liner 61 and the transition piece 62 are cooled by the low-temperature carbon dioxide flowing over outer surfaces thereof. Since the low-temperature carbon dioxide is thus not introduced into the combustor liner 61, an optimum combustion reaction is maintained.

Incidentally, for example, as illustrated in FIG. 4, a cylindrical guide 110 may be provided along an outer periphery of the transition piece 62 so that the carbon dioxide flows along the outer peripheral surface of the transition piece 62. The carbon dioxide introduced from the pipe 44 flows through an annular space which is provided between the transition piece 62 and the guide 110 and is opened at both ends.

In the combustor casing 70 with the above constitution, the upstream-side casing 71 and the downstream-side casing 72 are cooled by the low-temperature carbon dioxide without being exposed to the high-temperature carbon dioxide. Therefore, the upstream-side casing 71 and the downstream-side casing 72 are composed of Fe-based heat resistant steel such as CrMoV steel and CrMo steel, for example.

As described above, according to the gas turbine facility 10 of the second embodiment, providing the cylinder 100 makes it possible for the high-temperature carbon dioxide and the low-temperature carbon dioxide which have been introduced into the combustor casing 70 to flow separately from each other. This can prevent the combustor casing 70 from being exposed to the high-temperature carbon dioxide. Accordingly, the combustor casing 70 can be composed of inexpensive Fe-based heat resistant steel, for example.

Here, in the gas turbine facility 10 of the above-described embodiments, one example in which oxygen being the oxidant is supplied to the combustor 20 via the pipe 41 is given but a constitution is not limited to that of the example. For example, a constitution in which a part of the carbon dioxide pressurized by the compressor 28 is supplied into the pipe 41 may be adopted.

In the above case, a new pipe which branches off from the pipe 42 on a downstream side of the compressor 28 is provided. When FIG. 1 is referred to, this pipe which is made to branch off is coupled to the pipe 41 between the flow rate regulating valve 22 and the heat exchanger 24, for example. That is, a mixed gas composed of the oxidant and the carbon dioxide is guided to the combustor 20. Incidentally, this mixed gas is heated by passing through the heat exchanger 24.

In the above constitution as well, operation and effect similar to the operation and effect in the gas turbine facility 10 of the above-described embodiments can be obtained.

According to the above-described embodiments, it is possible for the casing provided around the combustor to be composed of an inexpensive material.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scoped and spirit of the inventions.

What is claimed is:

1. A gas turbine facility comprising:
    a combustor provided in a casing to combust a fuel and an oxidant, the combustor having a fuel nozzle part, a combustor liner and a transition piece, the fuel nozzle part being provided at an upstream-side end portion of the combustor liner, the transition piece being connected to a downstream-side end portion of the combustor liner;
    a cylinder dividing a space between the casing and the combustor into a first space and a second space, the cylinder being provided along a longitudinal direction of the combustor, the cylinder extending in the longitudinal direction to a position that is upstream to the upstream-side end portion of the combustor liner, the cylinder extending in the longitudinal direction to a position of a downstream-side end portion of the transition piece, an upstream-side end portion of the cylinder, which is upstream from the upstream-side end portion of the combustor liner, being connected to an inner peripheral surface of the casing;
    a turbine configured to be rotated by and exhaust a combustion gas from the combustor;
    a heat exchanger configured to cool the combustion gas exhausted from the turbine to form a cooled combustion gas and heat a first part of the cooled combustion gas;
    a first combustion gas supply pipe which guides the first part of the cooled combustion gas heated in the heat exchanger to the first space, the first space being interposed between the combustor and the cylinder;
    a second combustion gas supply pipe which guides a second part of the cooled combustion gas, which is cooled in the heat exchanger, to the second space, the second space being interposed between the casing and the cylinder, a temperature of the second part of the cooled combustion gas guided by the second combustion gas supply pipe being lower than a temperature of the first part of the cooled combustion gas heated in the heat exchanger guided by the first combustion gas supply pipe; and
    an exhaust pipe which exhausts a remaining third part of the cooled combustion gas to an outside.

2. The gas turbine facility according to claim 1, wherein the casing is constituted by an upstream-side casing and a downstream-side casing, and the first combustion gas supply pipe and the second combustion gas supply pipe are coupled to the upstream-side casing.

3. The gas turbine facility according to claim 2, wherein the first combustion gas supply pipe is coupled to the upstream-side casing more upstream than the second combustion gas supply pipe.

* * * * *